United States Patent
Hwang et al.

(10) Patent No.: US 10,433,219 B2
(45) Date of Patent: Oct. 1, 2019

(54) WLAN SYSTEM AND HANDOVER METHOD AND APPARATUS FOR USE THEREIN

(71) Applicant: Samsung Electronics Co., Ltd., Gyeonggi-do (KR)

(72) Inventors: Iksoon Hwang, Gyeonggi-do (KR); Jiwon Ha, Seoul (KR); Jongil Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/329,166

(22) Filed: Jul. 11, 2014

(65) Prior Publication Data

US 2015/0016414 A1    Jan. 15, 2015

(30) Foreign Application Priority Data

Jul. 11, 2013  (KR) .................. 10-2013-0081818

(51) Int. Cl.
*H04W 36/00* (2009.01)
*H04W 84/12* (2009.01)

(52) U.S. Cl.
CPC ........ *H04W 36/0079* (2018.08); *H04W 84/12* (2013.01)

(58) Field of Classification Search
CPC . H04W 28/06; H04W 36/0055; H04W 36/02; H04W 48/10; H04W 84/12; H04W 88/08
See application file for complete search history.

(56) References Cited

U.S. PATENT DOCUMENTS

| 7,924,785 | B2 * | 4/2011 | Shaheen | H04W 36/0061 370/331 |
| 8,270,409 | B2 | 9/2012 | Hancock et al. | |
| 2003/0114158 | A1 * | 6/2003 | Soderbacka | H04W 36/0066 455/436 |
| 2004/0063426 | A1 * | 4/2004 | Hunkeler | H04W 48/10 455/426.1 |

(Continued)

FOREIGN PATENT DOCUMENTS

| EP | 1 441 469 | 7/2004 |
| KR | 1020050096985 | 10/2005 |

(Continued)

OTHER PUBLICATIONS

Hyung Heon Kim et al., "Fast-Handover Mechanism Between 802.11 WLAN and 802.16 WiMax with MIH in PMIPv6", IEEE, Proceedings of the 4th International Conference on Ubiquitous Information Technologies & Applications, Dec. 20, 2009, 6 pages.

(Continued)

*Primary Examiner* — Michael Thier
*Assistant Examiner* — Prince A Mensah
(74) *Attorney, Agent, or Firm* — The Farrell Law Firm, P.C.

(57) ABSTRACT

A Wireless Local Area Network (WLAN) system, a handover method, and an apparatus for use therein are provided. A handover method of a station in a wireless local area network (WLAN) system includes storing handover availability information received from a connected Access Point (AP) connected to the station; and suspending, when the handover availability information is set to "unavailable", an operation for handover to another AP.

13 Claims, 9 Drawing Sheets

(56) References Cited

U.S. PATENT DOCUMENTS

| | | | | |
|---|---|---|---|---|
| 2004/0198220 | A1* | 10/2004 | Whelan | H04W 12/06 455/41.1 |
| 2004/0224690 | A1* | 11/2004 | Choi | H04W 36/0055 455/436 |
| 2005/0026615 | A1* | 2/2005 | Kim | H04W 36/0072 455/436 |
| 2006/0246890 | A1* | 11/2006 | Yasuda | H04W 48/04 455/425 |
| 2007/0025294 | A1* | 2/2007 | Kim | H04W 36/005 370/331 |
| 2007/0049323 | A1* | 3/2007 | Wang | H04W 12/12 455/525 |
| 2008/0165739 | A1* | 7/2008 | Park | H04W 36/0055 370/331 |
| 2009/0046682 | A1* | 2/2009 | Kim | H04W 28/06 370/338 |
| 2010/0222053 | A1* | 9/2010 | GiriSrinivasaRao | H04W 24/08 455/432.1 |
| 2011/0045800 | A1* | 2/2011 | Yoneyama | H04W 12/06 455/411 |
| 2011/0134882 | A1* | 6/2011 | Aoyama | H04W 36/0066 370/331 |
| 2012/0165065 | A1* | 6/2012 | Sawada | H04W 36/0072 455/525 |
| 2013/0225162 | A1* | 8/2013 | Somekawa | H04W 8/183 455/432.1 |

FOREIGN PATENT DOCUMENTS

| | | |
|---|---|---|
| KR | 1020090065048 | 6/2009 |
| KR | 1020100030918 | 3/2010 |
| KR | 1020100036523 | 4/2010 |
| WO | WO 2007/029881 | 3/2007 |

OTHER PUBLICATIONS

Andrea Francini et al., "Media Independent Handover", IEEE 802.21, Media Independent Handover Services, IP017660627, Jul. 12, 2005, 20 pages.

European Search Report dated Dec. 16, 2016 issued in counterpart application No. 14822492.6-1854, 11 pages.

* cited by examiner

WLAN SYSTEM AND HANDOVER METHOD AND APPARATUS FOR USE THEREIN

PRIORITY

This application claims priority under 35 U.S.C. § 119(a) to a Korean Patent Application filed on Jul. 11, 2013 in the Korean Intellectual Property Office and assigned Serial No. 10-2013-0081818, the entire content of which is incorporated herein by reference.

BACKGROUND

1. Field of the Invention

The present invention generally relates to a wireless communication system and a handover method and an apparatus for use therein and, and more specifically, to a Wireless Local Area Network (WLAN) system and a handover method and an apparatus for use therein.

2. Description of the Related Art

The current wireless communication system has become a system capable providing data communication services beyond the voice-oriented services. One of the representative wireless communication systems capable of providing high speed data communication services is Wireless Local Area Network (WLAN). The WLAN system is deployed in local area environment such as home, company, and office, and useful in various locations, e.g. a department store, a shopping mall, and an airport.

With the advance of the electronic and mobile communication technologies, the mobile communication terminals are designed to use the WLAN services while receiving the cellular communication service provided by the mobile carrier. The reason for embedding the WLAN function in the mobile communication terminal is that a data communication service such as data download can be provided without extra cost or at a low cost using the WLAN system, and thus is cost-effective as compared to the cellular communication network-based data communication service. Typically, the WLAN-enabled cellular communication terminal is configured to select the WLAN service for data communication with priority.

Meanwhile, the WLAN system provides the user with handover service to guarantee the mobility of the terminal like the most mobile communication systems that provide handover services to the users on the move. The handover function is provided in such a procedure that the terminal changes its connection to the network seamlessly when it moves from one service area to another service area.

In order to secure the terminal mobility even in the WLAN system, a handover procedure has been specified. A description is made briefly of the handover method specified for use in the WLAN system. The terminal (station) connects to an Access Point (AP) having an Extended Service Set (ESS) to receive services. If the received signal strength from the AP is weakened or no beacon signal is received in a predetermined time, the terminal determines that a handover condition is fulfilled. In this case, the terminal attempts handover to another AP.

In the WLAN system, typically, the ESS has one AP with the exception of the intra-company WLAN and some shopping malls. Accordingly, if a station receiving the data service in the ESS having one AP moves out of the service area, its handover attempt is unnecessary because there is no other AP.

Suppose a station capable of receiving data service through a cellular communication network as well as the WLAN system in the above situation. If the station receiving the data service in the ESS having one AP moves out of the service area of the AP, the station attempts handover to another AP. If it fails to discover another AP, the station continues to receive the data service through the cellular communication network. As described above, the station which receives data service in the ESS having only one AP consumes power unnecessarily by attempting the handover of no necessity.

Consider a case where the handover between the WLAN system and the cellular communication network is supported. It is typical that the station is configured to receive the data service through the WLAN system as far as possible rather than the cellular communication network. Accordingly, if the terminal in the state of receiving the data service in the ESS having one AP moves out of the service area of the AP, it attempts handover to another AP without priority before handover to the cellular communication network.

If such unnecessary handover procedure is repeated in the state of receiving the data service, this causes unnecessary power consumption of the station and increases unnecessary time delay for handover to the cellular communication network.

SUMMARY

The present invention has been made to address at least the above problems and/or disadvantages and to provide at least the advantages described below. Accordingly, an aspect of the present invention provides a method, an apparatus, and a system for reducing a number of unnecessary inter-Wireless Local Area Network (WLAN) handover attempts in a WLAN system.

Another aspect of the present invention provides a method, an apparatus, and a system capable of reducing power consumption of the station which is caused by unnecessary inter-WLAN handover attempts in a WLAN system.

Another aspect of the present invention provides a method, an apparatus, and a system for reducing a number of unnecessary inter-WLAN handovers in the system supporting handover between a WLAN and a cellular communication network, thereby facilitating the handover from the WLAN to the cellular communication network.

In accordance with an aspect of the present invention, a handover method of a station in a Wireless Local Area Network (WLAN) system is provided. The handover method includes storing handover availability information received from a connected Access Point (AP) connected with the station; and suspending, when the handover availability information is set to "unavailable", an operation for handover to another AP.

In accordance with another aspect of the present invention, a station supporting handover in a Wireless Location Area Network (WLAN) system is provided. The station includes a WLAN communication unit configured to communicate with a first Access Point (AP) of the WLAN system, a cellular communication unit configured to communicate with a cellular communication network, a modem configured to perform modulation/demodulation and encoding/decoding on data communicated with the first AP, and a control unit which controls storing handover availability information received from the first Access Point (AP) connected with the station, and to suspend, when the handover availability information is set to "unavailable", an operation for handover to another AP.

In accordance with another aspect of the present invention, a system for determining handover of a station is provided. The system includes a first Access Point (AP) which transmits at least one of a beacon signal and a probe response signal including handover availability information to the station, and the station which stores the handover availability information included in that at least one of the beacon signal and probe response signal received from the AP, and determines whether to perform handover to a second AP depending on the handover availability information.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION OF EMBODIMENTS OF THE PRESENT INVENTION

Embodiments of the present invention are described with reference to the accompanying drawings in detail. The accompanying drawings are presented to help understand the present invention, and the present invention is not limited to the shapes and arrangements of the components predicted in the drawings. The equivalents or modifications of the embodiments on the accompanying drawings of the present invention should be more ready by reference to the detailed description.

Figure 1:
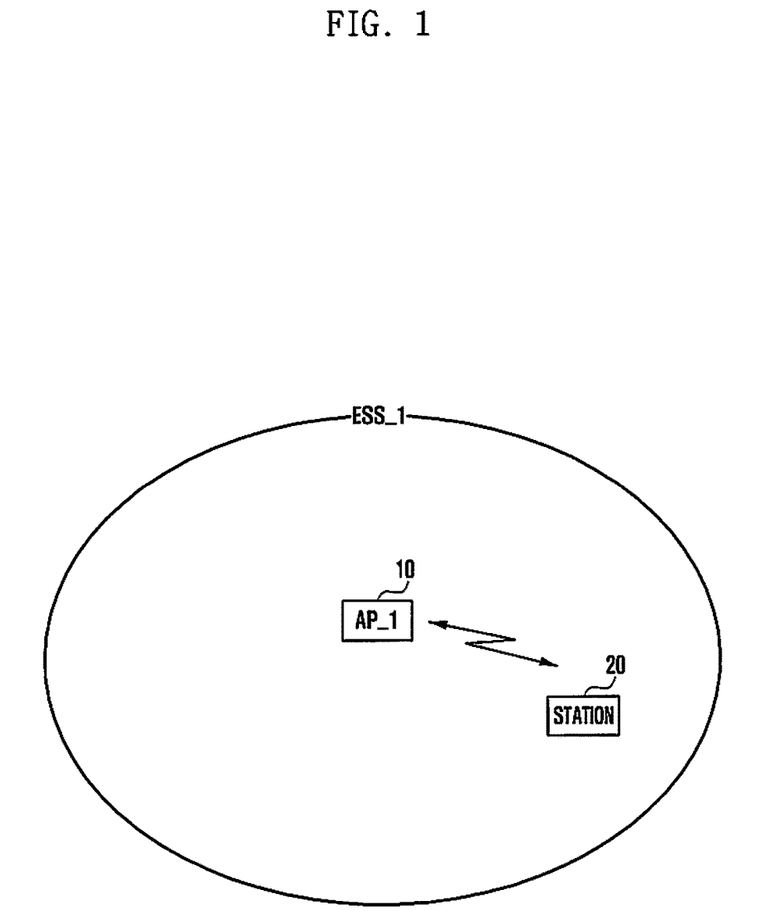
FIG. 1 is a schematic diagram illustrating an Extended Service Set (ESS) comprised of a single Access Point (AP) and a station.

FIG. 1 is a schematic diagram illustrating an Extended Service Set (ESS) comprised of a single Access Point (AP) and a station.

Referring to FIG. 1, ESS_1 represents an ESS of the Wireless Location Area Network (WLAN) system including an AP_1 10. The AP_1 10 broadcasts a beacon signal for data communication with the station 20.

The AP_1 10 transmits information on the AP using the beacon signal according to an embodiment of the present invention. Unlike a conventional AP, the AP_1 10 according to an embodiment of the present invention transmits the beacon signal including information on whether inter-AP handover between the APs included in the ESS_1 is supported. In the following description, the information on whether the inter-AP handover between the APs in the same ESS is referred to as handover availability information.

The handover availability information may be provided explicitly, or estimated based on the number of APs included in the ESS_1 or the information on whether the ESS_1 consists of a single AP or a plurality of APs. Even when the ESS_1 consists of a plurality of APs, the handover availability information may be configured to indicate no handover, and, in this case, the handover availability information should be provided explicitly.

The handover availability information may be transmitted using 1 bit of the reserved field of the beacon signal or may be indicated in combination with other information. When using 1 bit of the reserved field of the beacon signal, any specific bit position is not specified in this embodiment. However, the description may be made with some available bits to help understand the present invention.

One bit of the reserved field for use in transmitting the handover availability information may be one bit of the reserved subfield of the Capability Information element field, Vendor Specific information element field, or Extended Capabilities Information element field.

When the handover of the WLAN station to a heterogeneous data network is supported, the handover availability information on the handover from the AP to a heterogeneous data network may be included as defined in IEEE 802.11u. In the following description, the information indicating whether the handover from the current AP to a heterogeneous data network is supported is referred to as heterogeneous network handover availability information.

The AP_1 10 of the ESS_1 according to an embodiment of the present invention broadcasts the beacon signal including the handover availability information on the handover to another AP. In FIG. 1, since the ESS_1 consists of a signal AP_1 10, it is impossible to perform handover to another AP. If the handover availability information set to "0" is used for indicating handover non-supportability, the AP_1 10 transmits the handover availability information set to "0". If the handover availability information set to "1" is used for indicating handover non-supportability, the AP_1 10 transmits the handover availability information set to "1".

Although the present invention can be extended so as to notify of the number of APs, this requires transmission of extra information with increased number of bits, and thus, the description hereinafter is made to the case of using the handover availability information.

As shown in FIG. 1, the AP_1 10 transmits the beacon signal including the handover availability information set to "unavailable". That is, the AP notifies that the handover to another AP is not available. The station 20 stores the information received through the beacon signal and may acquire the AP configuration information of the ESS_1. After connecting to the AP_1 10, the station 20 receives the handover availability information to check whether handover is available. The station 20 connected to the AP_1 10 may perform handover or not based on the checking result. The handover using the handover availability information on the handover to another AP is described in detail with reference to a flowchart below.

Figure 2:
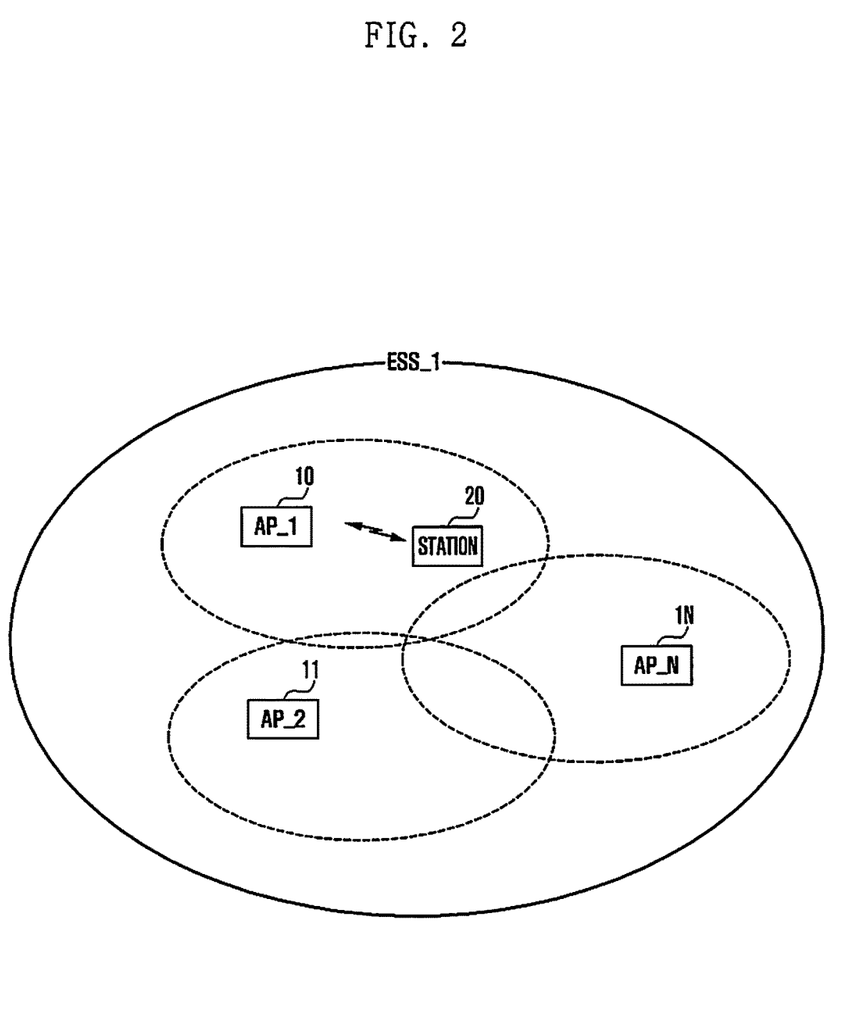
FIG. 2 is a schematic diagram illustrating an ESS comprised of two or more APs and a station.

FIG. 2 is a schematic diagram illustrating an ESS comprised of two or more APs and a station.

In FIG. 2, distinct APs 10, 11, . . . , and 1N constitute an ESS illustrated by ESS_1. As described above, if the ESS_1 is comprised of a plurality of APs, this is likely to be a case in such as a company and public place.

As shown in FIG. 2, if a plurality of APs 10, 11, . . . , and 1N constitute ESS_1, the APs 10, 11, . . . , 1N have respective communication areas. In FIG. 2, the areas centered around the APs 10, 11, . . . , 1N in the ESS_1 are the communication areas of the corresponding APs. Accordingly, the APs 10, 11, . . . , and 1N broadcast the beacon signals at predetermined intervals within the respective communication areas and perform communication with the stations located within their communication areas.

At this time, the APs 10, 11, . . . , and 1N also transmit the beacon signals including the handover availability information according to an embodiment of the present invention. As described above, the handover availability information may be configured with one bit, a number of bits equal to the number of APs, or a plurality of bit through combination with other information. The beacon signal also may include the heterogeneous network handover availability information notifying whether handover from the AP to a heterogeneous network is available.

As shown in FIG. 2, if the ESS_1 is comprised of a plurality of APs 10, 11, . . . , and 1N, the handover availability information is set to "available" in the beacon signal. That is, the APs 10, 11, . . . , and 1N broadcast the beacon signal including the handover availability information set to "available". The station 20 stores the information received in the beacon signal and acquires the AP configuration information, i.e. handover availability information, of the ESS_1. The station 200 connected to the AP_1 10 checks the handover availability information in advance to determine whether to perform inter-AP handover or not depending on the handover availability information. The handover to another AP based on the handover availability information is described in detail with reference to a flowchart below.

The above-described handover availability information has to be configured per AP by the user or network operation when configuring the ESS. The handover may be unavailable even when the ESS is comprised of a plurality of APs as shown in FIG. 2, and, in this case, the user or the network operation has to set the handover availability information to "unavailable". Also, the heterogeneous network handover availability information indicating whether the AP supports handover to heterogeneous network may be configured by the network operator or at the product manufacturing stage in advance.

Figure 3:
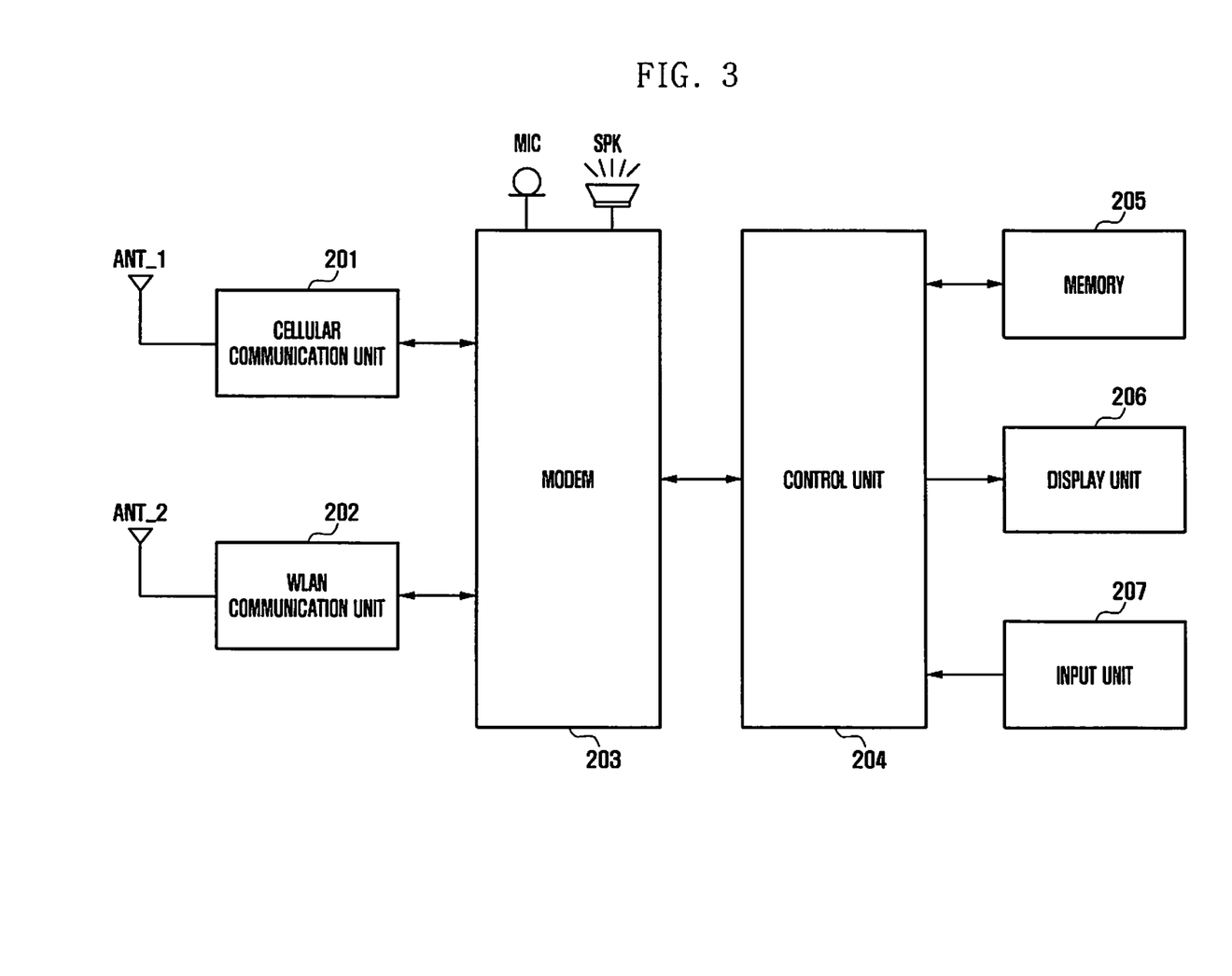
FIG. 3 is a block diagram illustrating a configuration of a smart station supporting both the cellular communication network and Wireless Location Area Network (WLAN) services according to an embodiment of the present invention.

FIG. 3 is a block diagram illustrating a configuration of a smart station supporting both the cellular communication network and WLAN services according to an embodiment of the present invention.

The smart station includes a first antenna ANT_1 for use in the cellular communication network and a second antenna ANT_2 for use in the WLAN, which are connected to a cellular communication unit 201 and a WLAN communication unit 202, respectively.

The cellular communication unit 201 up-converts the signal carrying the voice and/or data to be transmitted to a base station of the cellular communication network and down-converts the signal received from the cellular communication network. That is, the cellular communication unit 201 converts the baseband signal of the transmission signal to a radio frequency signal which is transmitted to the cellular communication network through the first antenna ANT_1 and converts the radio signal received from the cellular communication network through the first antenna ANT_1 to the baseband signal.

The WLAN communication unit 202 up-converts the signal carrying the transmission data to WLAN frequency band signal and down-converts the received WLAN frequency band signal to a baseband signal. That is, the WLAN communication unit 202 up-converts the baseband single of the transmission data to the WLAN frequency band signal which is transmitted to the WLAN through the second antenna ANT_2 and down-converts the WLAN frequency band signal received through the second antenna ANT_2 to the baseband signal.

The modem 203 performs data processing such as modulation/demodulation and encoding/decoding on the transmission/reception data. FIG. 3 illustrates a normal smart station having a modem 203 which includes a vocoder for performing modulation/demodulation and encoding/decoding on the voice signal. The modem 203 receives the electrical voice signal which is converted from the voice input through the microphone (MIC) and converts the electrical voice signal to a digital voice signal. The modem 203 also converts the digital voice signal to the analog electrical voice signal and outputs the electrical voice signal through a speaker (SPK). The modem 203 may also perform processing modulation/demodulation and encoding/decoding on the other types of data under the control of the control unit 204.

The control unit 204 controls overall operations of the smart station in an embodiment of the present invention, and particularly, controls the handover of the station when connected to the WLAN. The handover of the station when connected to the WLAN is described in detail with reference to a flowchart below.

The memory 205 is a storage medium (such as Read Only Memory (ROM) and Random Access Memory (RAM)) that is capable of storing various control data concerning the operation of the smart station and, particularly in an embodiment of the present invention, the handover availability information received in the beacon signal, probe response message and/or other message or signals. The memory 205 also may store the heterogeneous network handover availability information indicating whether handover from an AP to a heterogeneous network is supported. The memory 105 also may include regions for storing user data.

The display unit 206 may be implemented with a Liquid Crystal Display (LCD) panel or a Light Emitting Diodes (LED) panel, and displays the operation of the smart station and the state of the smart station in the idle state under the control of the control unit 204.

The input unit 207 includes a touch sensor for detecting the touch input of the user and key buttons for receiving key input. The input unit 207 generates a signal corresponding to the touch and/or the key input to the control unit 204.

The smart station configured as shown in FIG. 3 is an example of the station described with reference to FIGS. 1 and 2, and is assumed in the flowcharts to be described hereinafter. However, the present invention is not limited to the above-described smart station, and may be applicable to any type of station supporting only the WLAN communication service or both the WLAN and other data communication services.

Figure 4A:
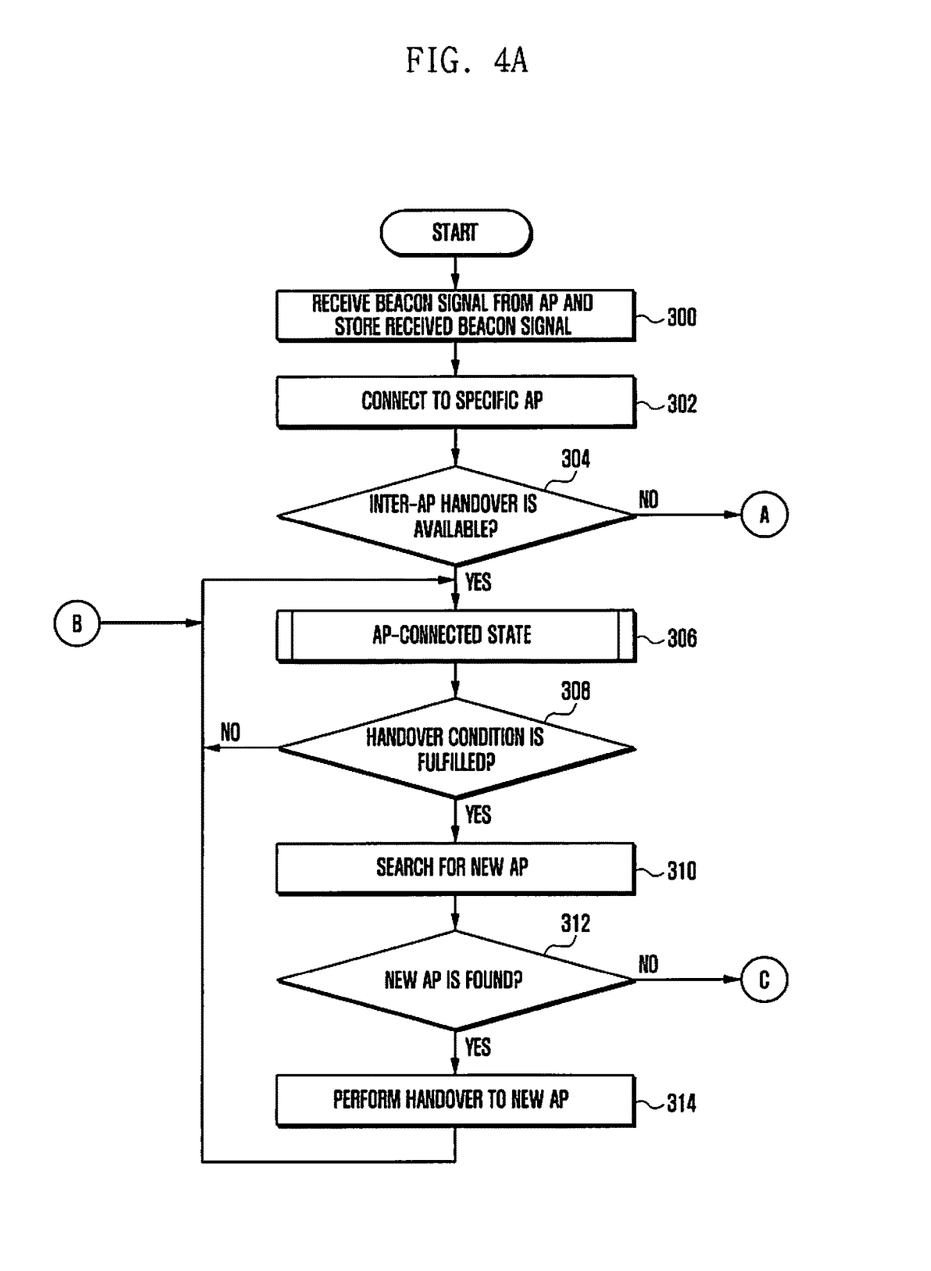
FIGS. 4A and 4B are a flowchart illustrating a handover procedure of the smart station in the state of receiving the WLAN service according to an embodiment of the present invention.
Figure 4B:
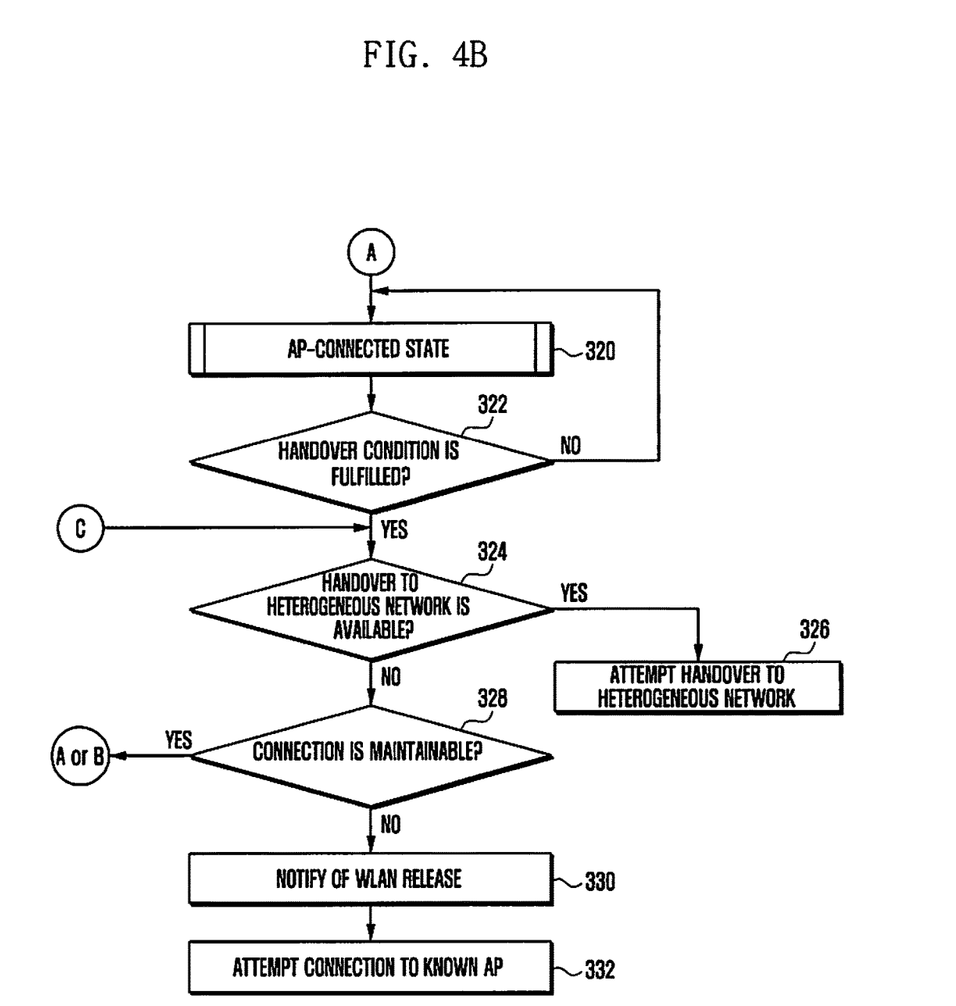

FIGS. 4A and 4B are a flowchart illustrating a handover procedure of the smart station in the state of receiving the WLAN service according to an embodiment of the present invention.

The flowchart of FIGS. 4A and 4B is depicted under the assumption that the station has been connected to a WLAN already, and under the assumption that the station configured as shown in FIG. 3 is in one of the situations as shown in FIGS. 1 and 2.

The control unit 204 of the smart station receives a beacon signal including the handover availability information from an AP of the ESS through the WLAN communication unit 202 and the modem 204, and stores the necessary information extracted from the beacon signal in the memory 205, in step 300. The control unit 204 stores the handover availability information, i.e. the information on whether it is possible to perform handover to another AP, in the memory 205. The beacon signal may include the heterogeneous network handover availability information, and, in this case, the control unit 204 stores the heterogeneous network handover availability information together. In this way, it is possible to check whether the AP to which the station is connected is included in the ESS with a single AP or multiple APs based on the received information. Also, the control unit 204 may determine whether to perform handover based on the handover availability information check result when the handover condition is fulfilled.

The control unit 204 controls the modem 203 and the WLAN communication unit 202 to establish a connection to the corresponding (or specific) AP in step 302, and checks whether the handover availability information is set to "available" in step 304. If the handover availability information is set to "available" in step 304, the procedure goes to step 306 and, if the handover availability information is set to "unavailable", the procedure goes to step 320.

If the handover availability information is set to "available" in step 304, the control unit 204 maintains the connection to the AP (i.e., an AP-connected state) in step 306. The connected state includes a state of communicating data with the AP and an idle state in which the station checks whether there is any data communication with the AP even without actual data communication.

The control unit 204 observes the received signal strength from the WLAN communication unit while maintaining the connected state in step 306. The control unit 204 checks whether the signal strength received by the WLAN communication unit 202 fulfills the handover condition in step 308. If the handover condition is fulfilled in step 308, the procedure goes to step 310. If the handover condition is not fulfilled in step 308, the procedure returns to step 306. The handover condition is fulfilled when no signal is received from the AP in a predetermined time or the received signal strength from the AP decreases to be less than or equal to a predetermined threshold value.

If the handover condition is fulfilled in step 308, the control unit 204 attempts the handover to the corresponding (or specific) AP. That is, the control unit 204 searches for a new AP in step 310 since it has been checked already that the inter-AP handover is available at in step 304. That is, the control unit 204 scans around to search for an AP available for handover thereto.

The control unit 204 controls the WLAN communication unit 202 and the modem 204 to check the AP connected thereto currently and the signal strength of the beacon signal from the AP in step 310. That is, the control unit 204 checks, if there is any signal received from a certain AP, the signal strength from the AP while scanning around to search for new AP and checking whether any signal is received from the connected AP.

The control unit 204 determines whether any new AP is found in step 312. If a new AP is found, this means that any signal is received from at least one of the other APs included in the same ESS as the old AP. Also, this means the received signal strength of the corresponding AP is strong enough for communication and available for handover. If a new AP is found in step 312, the control unit 204 performs handover to the new AP by controlling the WLAN communication unit 202 and modem 203 in step 314. If no other AP is found in step 312, the procedure goes to step 324.

After step 314, the inter-AP handover procedure in steps 306 to 314 is performed again, which is described here briefly. If it is required to perform handover, the station may check whether there is any neighbor AP available for handover using Active Set. The station transmits a probe request message (ProbeRequest) including Service Set IDentifier (SSID) of the connected AP through various channels. If a Probe Response message (ProbeResponse) is received from at least one neighbor AP, the station measures the signal strength from the AP which transmits the ProbeResponse and selects an AP for new connection. At this time, the ProbeResponse may include the data transmitted in the beacon signal according to an embodiment of the present invention. That is, the ProbeResponse may include the inter-AP handover availability information. If a new AP is selected, the station performs a handover procedure through Authentication and Reassociation with the selected AP.

If the procedure goes from step 304 to step 320, the control unit 204 maintains the connection to the AP in step 320. Here, the AP-connected state in step 306 and the AP-connected state in step 320 are identical with each other with the exception of the availability for handover. That is, the AP-connected state in step 320 is a state of no inter-AP handover. This means that the station has received the information indicating that inter-AP handover is unavailable in the beacon signal transmitted by the AP.

Because the handover to a heterogeneous network is assumed here, it is necessary to perform step 322 to determine whether the handover condition is fulfilled. However, if it is not allowed to perform handover to a heterogeneous network, the control unit 204 may skip the operation of determining whether the handover condition is fulfilled, i.e. step 322, and may perform step 324 before step 322.

If the signal strength from the connected access network which is measured in step 322 fulfills the handover condition, the control unit 204 determines whether handover to a heterogeneous network is available in step 324.

Step 324 is performed in two cases. The first case is that the procedure is branched from step 312 to step 324. This is the case that the handover to another AP is available but it fails to discover a new AP for handover. The second case is that the procedure is branched from step 322 to step 324. This is the case that handover availability information received from the AP indicates "unavailable" but handover to a heterogeneous network is allowed, and the handover condition is fulfilled.

In step 324, the control unit 204 determines whether handover to a heterogeneous network, e.g. cellular communication network such as a Long Term Evolution (LTE) system. The handover availability determination in step 324 is applicable when the station has the capability of communicating with at least two different networks. If the station does not support communication with a heterogeneous network, it operates as follows for the above two cases. Instead of branching from step 312 to step 324, the procedure may be configured to go directly to step 328 or 330 after step 332, or to perform only step 330. Instead of branching from step 322 to step 324, the procedure may be configured to go directly to step 328 or 330 after step 332, or to perform only step 330.

Hereinafter, the smart station supporting communication with WLAN and cellular communication network is assumed, and thus, step 324 is performed. For the explanation convenience, it is assumed that the heterogeneous data network is a cellular communication network such as the LTE system.

If it is determined that handover to the heterogeneous network, i.e. the cellular communication network, is available in step 324, the control unit 204 attempts handover to the heterogeneous network in step 326. When checking the availability of handover to the heterogeneous network, the control unit 204 controls the cellular communication unit 201 and the modem 203 to check the received signal strength from the base station of the cellular communication network.

When attempting handover to the heterogeneous network, it is possible to delete the handover availability information, i.e. the information indicating whether handover to another AP is available. The handover availability information, i.e. the information indicating whether handover to another AP is available, may be updated when the station has no communication with a WLAN while connecting to the WLAN.

If it is determined that handover to the heterogeneous network is unavailable in step 324, the control unit 204 determines whether the signal strength of the connected AP is strong enough to maintain the connection thereto in step 328. That is, the control unit 204 determines whether it is possible to maintain the connection to the corresponding AP, or the handover condition is resolved although the channel condition is bad, to fulfill the handover condition.

If it is determined that the signal strength of the connected AP is strong enough to maintain the connection in step 328, the procedure goes to step 306 or 320 so as to maintain the connection to the AP. That is, the station suspends an operation for handover to another AP or the heterogeneous network. If the handover condition is fulfilled in step 308 or 322, the station may perform inter-AP handover in step 314 or/and handover to the heterogeneous network in step 326.

If it is determined that the signal strength of the connected AP is not strong enough to maintain the connection in step 328, the station notifies of the WLAN connection release in step 330 and attempts connection to a known AP or a heterogeneous network in step 332.

As described above, the AP has the information on whether the handover to another AP is available and notifies the station of this information. Accordingly, the station acquires the information on whether it is possible to perform handover to another AP in the same ESS. The handover procedure may be divided into two operations.

In the first operation, i.e., the handover availability information is set to "unavailable", it is notified that there is no need of attempting handover to another AP. Accordingly, it is possible to avoid attempting unnecessary handover. If handover to a heterogeneous network is available, the station performs handover to the heterogeneous network. If the handover to the heterogeneous network is unavailable, the station maintains the connection to the AP or releases the WLAN connection. That is, when the inter-AP handover is not available, the station does not attempt unnecessary handover.

In the second operation, i.e., the handover availability information is set to "available", the station attempts handover to another AP when the handover condition is fulfilled. In this case, the station may determine whether to perform inter-AP handover based on the handover availability information provided by the other AP. If the station is not supporting connection to a heterogeneous network, it notifies of the release of the WLAN connection and ends the process.

In the above description, the beacon signal includes the heterogeneous network handover availability information. However, the beacon signal may be configured without the heterogeneous network handover availability information due to the reason that the AP does not support IEEE 802.11u or to instruct to perform handover to a heterogeneous network through preferred SSID management of the station as specified in the 3GPP TS23.234. That is, when the station cannot perform handover to another AP in the same ESS, the station attempts handover to the heterogeneous network based on the preferred SSID information stored in the station. In this case, the beacon is transmitted without the heterogeneous network handover availability information.

Figure 5:
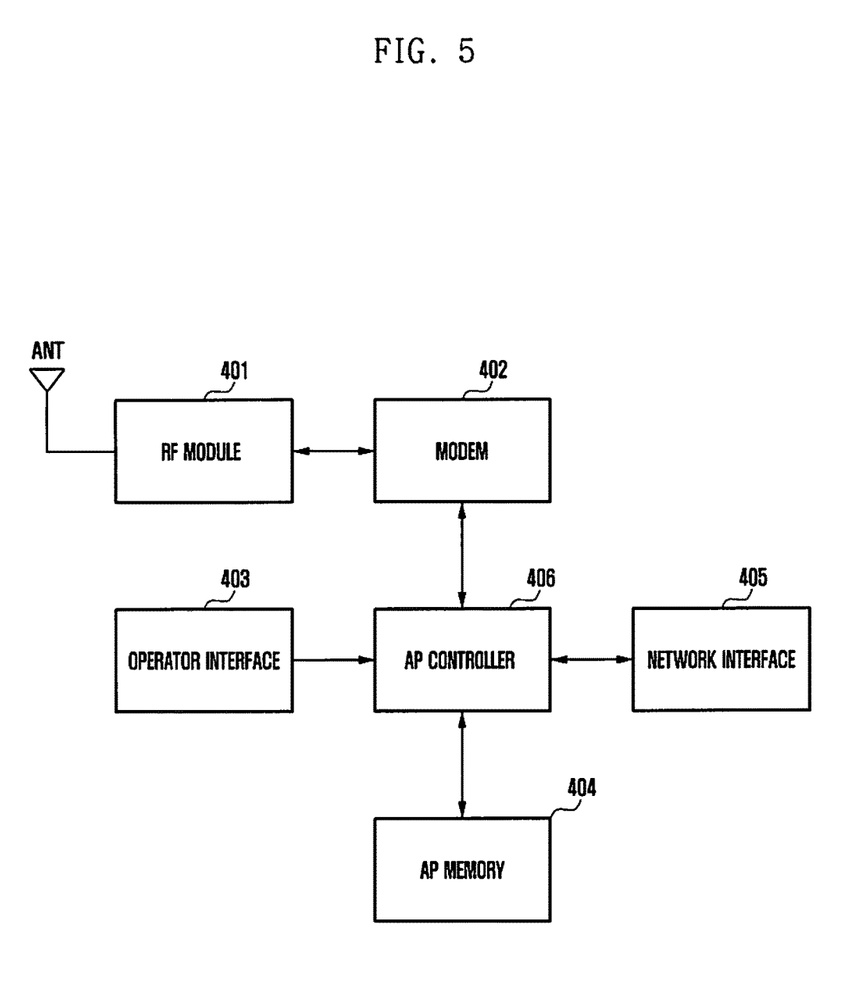
FIG. 5 is a block diagram illustrating a configuration of the AP according to an embodiment of the present invention.

FIG. 5 is a block diagram illustrating a configuration of the AP according to an embodiment of the present invention.

The AP includes at least one antenna ANT for use in communication with a station. The antenna is connected to a Radio Frequency (RF) module 401 to transmit signals in the air, receives the signal having the wavelength corresponding to the length of the antenna, and transfers the signal to the RF module 401.

The RF module 401 up-converts the transmission signal to a predetermined frequency band signal which is transmitted through the antenna ANT and down-converts the signal received through the antenna ANT to the baseband signal which can be processed by the modem.

The modem 402 performs data processing such as modulation/demodulation and encoding/decoding on the data communicated with the station.

The operator interface 403 is a part for use in communication with an external device such as operator computer. The operator interface 403 makes it possible to transfer the information received from the external device to the AP controller 406 and to transfer the data from the AP controller 406 to the external device. Particularly, when the operator configures the inter-AP handover availability information, the operator interface 403 provides the interface to the external device.

The AP memory 404 stores control data concerning the operation of the AP and the temporary data generated in the control operation, and particularly, the inter-AP handover availability information described in the present invention.

The network interface 405 provides a data communication interface between the AP and a communication node of another network.

The AP controller 406 controls the communication with stations and other network, and particularly, the inter-AP handover described in the present invention. The AP controller 406 also controls such that the handover availability information is transmitted to the station as described in the present invention.

Figure 6:
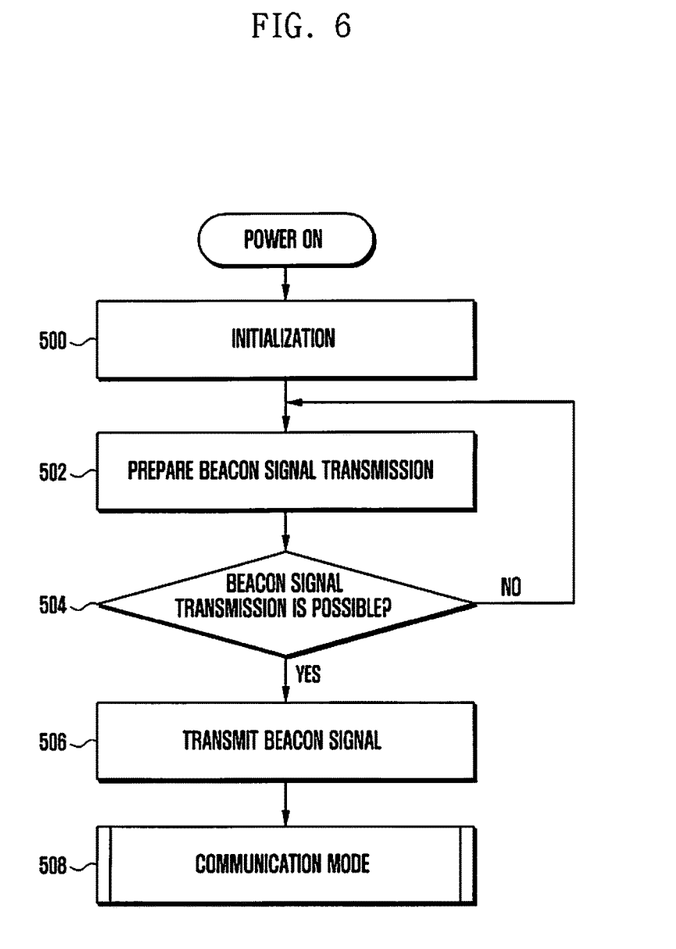
FIG. 6 is a flowchart illustrating an inter-AP handover availability information transmission procedure of the AP according to an embodiment of the present invention.

FIG. 6 is a flowchart illustrating an inter-AP handover availability information transmission procedure of the AP according to an embodiment of the present invention.

In FIG. 6, the AP powers on initially. The components of the AP are initialized in step 500. At this time, the AP controller 406 checks the modules and interfaces of the AP as configured in the AP memory 404. The AP controller 406 also reads the handover availability information from the AP memory 404.

The AP controller 406 generates beacon information to notify of the existence of the AP using the information stored in the AP memory and prepares signal transmission, in step 502. Then the AP controller 406 checks whether it is possible to transmit the beacon signal in step 504. The beacon signal transmission possibility checking can be a part of the method for avoiding collision with the beacon signals of neighbor APs.

If it is determined that the beacon signal transmission is not possible in step 504, the procedure goes back to step 520. If it is determined that the beacon signal transmission is possible in step 504, the AP controller 406 controls the modem 402 and the RF module 401 to broadcast the beacon signal. Finally, the AP enters the communication mode in step 508.

Here, the communication mode includes checking whether the probe request message (ProbeRequest) is received from the station, receiving an authentication request message from the station after transmitting the probe response message (ProbeResponse), and transmitting an authentication response message generated based on when authentication is successful. That is, the communication mode includes all of the operations for data communication between the station and the AP.

The inter-AP handover availability may be notified using the probe response message or before the transmission of the beacon message. That is, the probe response message may include the handover availability information. The communication mode may include all of the operations necessary for inter-AP handover of the station.

Figure 7A:
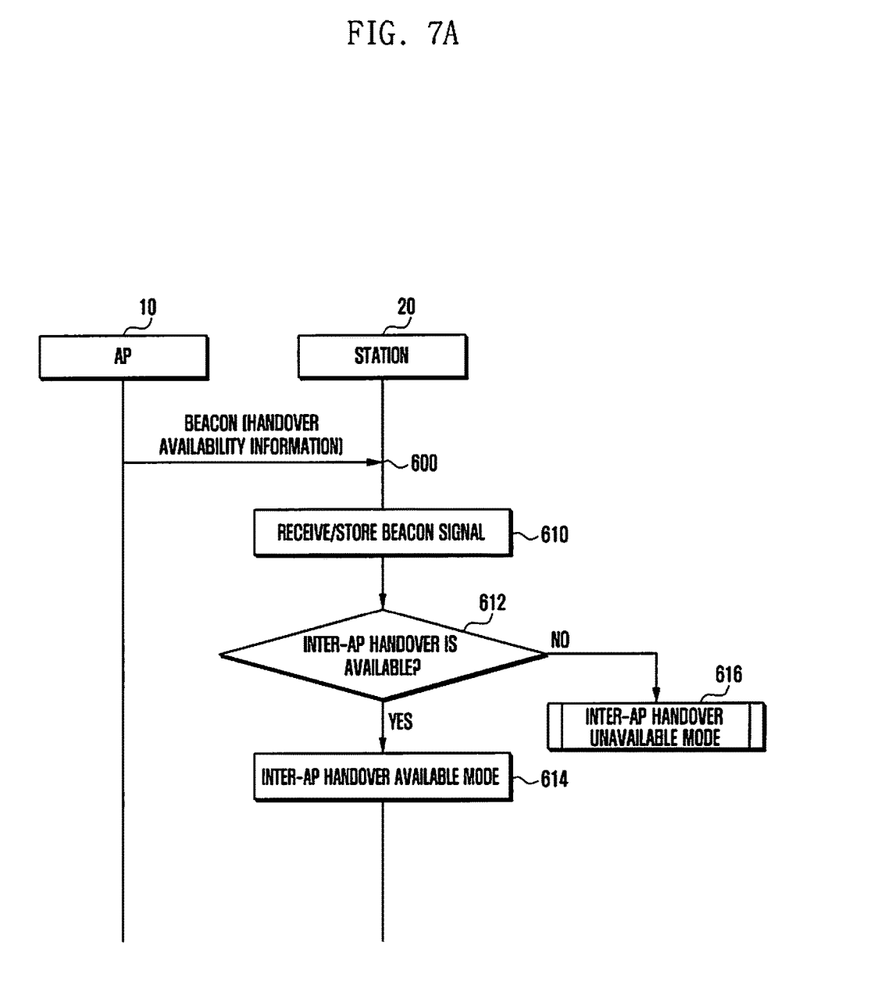
FIG. 7A is a signal flow diagram illustrating a procedure of transmitting the handover availability information from the AP to the station using the beacon signal according to an embodiment of the present invention.

FIG. 7A is a signal flow diagram illustrating a procedure of transmitting the handover availability information from the AP to the station using the beacon signal according to an embodiment of the present invention.

The AP 10 transmits the beacon signal to the station 20 in step 600. The beacon signal may include the handover availability information as described above. If the beacon signal is received from the AP in step 600, the station stores the information carried in the beacon signal in the memory 205.

The station checks the handover availability information in step 612. If it is determined that the inter-AP handover is available in step 612, the station 20 enters the inter-AP handover available mode in step 614. If it is determined that the inter-AP handover is unavailable in step 612, the station 20 enters the inter-AP handover unavailable mode in step 616.

Here, the handover available mode corresponds to the process from step 306 to 314 in FIGS. 4A and 4B. The handover available mode also may correspond to the process from step 320 to 326 or the process from step 320 to 332 in FIGS. 4A and 4B. If it is not necessary to perform handover to a heterogeneous network, the procedure may include only steps 320 and 330. In another embodiment having no necessity of heterogeneous network, the procedure may include only steps 320, 328, and 330. In yet another embodiment having no necessity of heterogeneous network, the procedure may include steps 320, 328, 330, and 332.

Figure 7B:
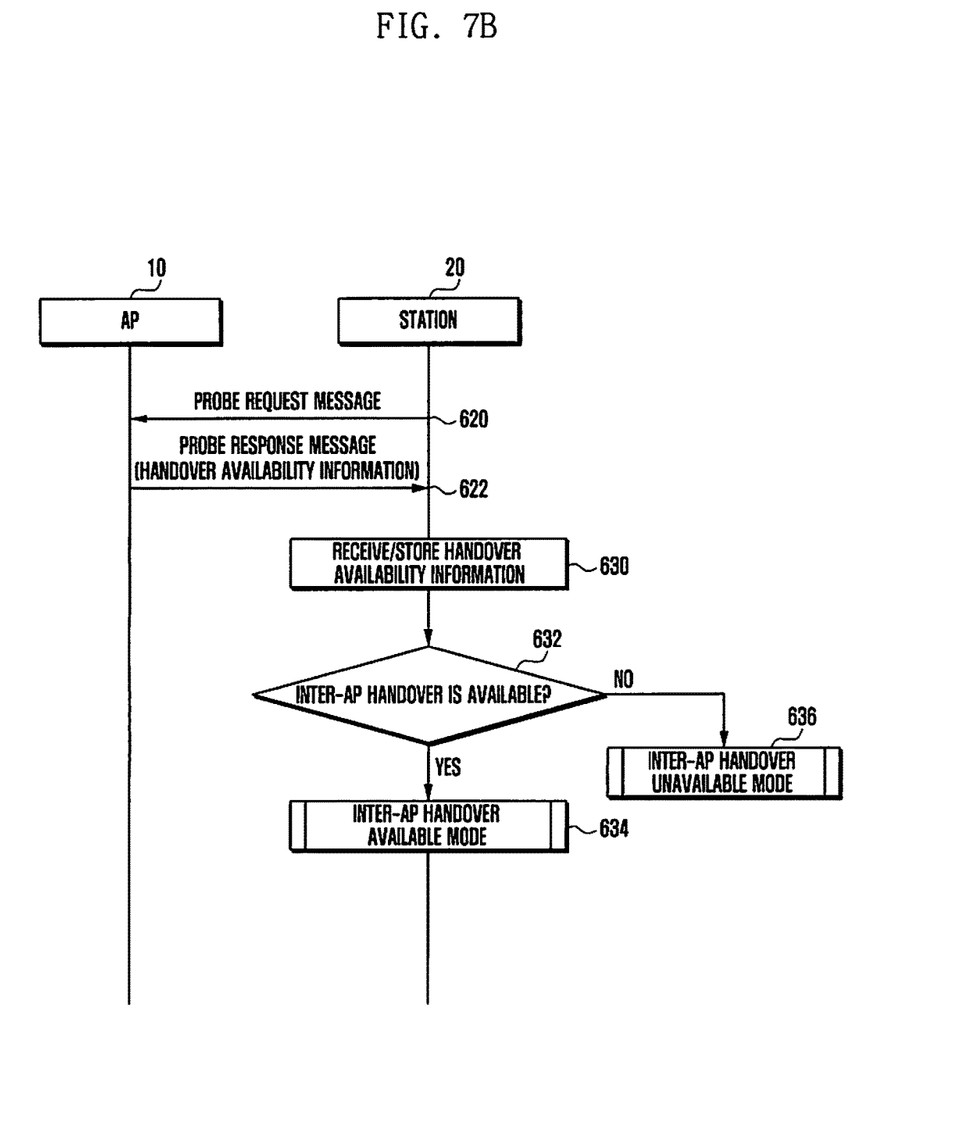
FIG. 7B is a signal flow diagram illustrating a procedure of transmitting the handover availability information from the AP to the station using a probe message according to an embodiment of the present invention.

FIG. 7B is a signal flow diagram illustrating a procedure of transmitting the handover availability information from the AP to the station using a probe message according to an embodiment of the present invention.

If the station 20 transmits a probe request message (ProbeRequest) in step 620, the AP 10 receives this message and transmits a probe response message (ProbeResponse) to the station 20 in step 622. At this time, the probe response message (ProbeResponse) may include the handover availability information as described above.

If the probe response message (ProbeResponse) is received, the station 20 stores the handover availability information in the memory 205 in step 630.

The station 20 checks the handover availability information in step 632. If it is determined that inter-AP handover is available in step 632, the station enters the inter-AP handover available mode in step 634. If it is determined that inter-AP handover is not available in step 632, the station enters the inter-AP handover unavailable mode in step 636.

Here, the handover available mode corresponds to the process from steps 306 to 314 in FIGS. 4A and 4B. The handover available mode also may include the process from step 312 to 324. The handover unavailable mode may correspond to the process of from steps 320 to 326 or the process from step 320 and 332 in FIGS. 4A and 4B. If it is not necessary to perform handover to a heterogeneous network, the procedure may include only steps 320 and 330. In another embodiment having no necessity of heterogeneous network, the procedure may include only steps 320, 328, and 330. In yet another embodiment having no necessity of heterogeneous network, the procedure may include steps 320, 328, 330, and 332.

As described above, the WLAN system and handover method and apparatus for use therein according to the present invention is capable of preventing the station from attempting unnecessary handover when the station moves out of the service area of the WLAN of a WLAN system having no other AP and having the ESS consisted of a single AP as in the home network environment, thereby reducing unnecessary power consumption of the station.

Also, the WLAN system and handover method and apparatus for use therein according to the present invention is capable of preventing a station which moves out of the service area of the WLAN having the ESS consisted of a signal AP from attempting unnecessary inter-AP handover, especially in the future system supporting handover between heterogeneous data networks, thereby facilitating handover between heterogeneous data networks.

Although embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention as defined by the appended claims and their equivalents.

What is claimed is:

1. A handover method of a station in a Wireless Local Area Network (WLAN) system, the method comprising:
receiving, by the station, one of a beacon signal and a probe response signal including handover availability information received from an Access Point (AP) of the WLAN system, the handover availability information indicating whether a future handover from the AP is available or unavailable in the WLAN system;
storing the handover availability information received from the AP;
connecting to the AP, after receiving and storing the handover availability information from the AP;
determining whether a handover condition is fulfilled in the connected state with the AP; and
preventing an attempt for a handover in the WLAN system, when the handover condition is fulfilled, and the stored handover availability information is set to "unavailable",
wherein the attempt for the handover includes searching for a new AP available for the handover, and further includes at least one of transmitting a signal for connection with the new AP found by the searching and transmitting a signal to the AP requesting to perform a handover procedure, and wherein if an Extended Service Set (ESS) only has the AP, the handover availability information is set to "unavailable".

2. The method of claim 1, further comprising:
searching for the new AP available for the handover, when the handover condition is fulfilled, and the handover availability information is set to "available"; and
performing a handover to the new AP, when the new AP is found.

3. The method of claim 2, further comprising:
determining whether a handover to a heterogeneous network is available, when no new AP is found;
searching for a heterogeneous AP available for the handover, when the handover to the heterogeneous network is available; and
performing the handover to the heterogeneous AP, when the heterogeneous AP is found.

4. The method of claim 3, further comprising:
determining whether a current connection to the AP is maintainable, when the handover to the heterogeneous network is unavailable; and
maintaining the current connection to the AP, when the current connection to the AP is maintainable.

5. The method of claim 1, further comprising:
determining whether a handover to a heterogeneous network is available, when the handover availability information is set to "unavailable"; and
attempting the handover to the heterogeneous network, when the handover to the heterogeneous network is available and a handover condition is fulfilled.

6. The method of claim 5, further comprising:
determining whether a connection to the AP is maintainable, when the handover to the heterogeneous network is unavailable; and
maintaining the connection to the AP, when the connection to the AP is maintainable.

7. The method of claim 1, further comprising:
determining whether a connection to the AP is maintainable, when the handover availability information is set to "unavailable"; and
maintaining the connection to the AP, when the connection to the AP is maintainable.

8. The method of claim 1, wherein, when the handover availability information is included in the beacon signal, the handover availability information is indicated by a bit of a reserved subfield of capability information element field of the beacon signal, a bit of vendor specific information element field of the beacon signal, or a bit of an extended capabilities information element field of the beacon signal.

9. A station supporting handover in a Wireless Location Area Network (WLAN) system, the station comprising:
a WLAN communication unit configured to communicate with an Access Point (AP) of the WLAN system;
a memory; and
a control unit configured to:
receive, via the WLAN communication unit, one of a beacon signal and a probe response signal including handover availability information received from the AP of the WLAN system, the handover availability information indicating whether a future handover from the AP is available or unavailable in the WLAN system;
store, in the memory, the handover availability information received from the AP;
connect, via the WLAN communication unit, to the AP, after receiving and storing the handover availability information from the AP;
determine whether a handover condition is fulfilled in the connected state with the AP; and
preventing an attempt for a handover in the WLAN system, when the handover condition is fulfilled, and the stored handover availability information is set to "unavailable",
wherein the attempt for the handover includes searching for a new AP available for the handover, and further includes at least one of transmitting a signal for connection with the new AP found by the searching and transmitting a signal to the AP requesting to perform a handover procedure, and
wherein if an Extended Service Set (ESS) only has the AP, the handover availability information is set to "unavailable".

10. The station of claim 9, wherein the control unit is further configured to:
search for the new AP, when the handover condition is fulfilled and the handover availability information is set to "available", and
perform a handover to the new AP, when the new AP is found.

11. The station of claim 10, further comprising a cellular communication unit configured to communicate with a cellular communication network,
wherein the control unit is further configured to:
determine whether a handover to a heterogeneous network is available, when no new AP is found;
search for a heterogeneous AP available for the handover, when the handover to the heterogeneous network is available; and
perform the handover to the heterogeneous AP, when the heterogeneous AP is found.

12. The station of claim 11, wherein the control unit is further configured to:
determine whether a connection to the AP is maintainable, when the handover to the heterogeneous network is unavailable; and
maintain the connection to the AP, when the connection to the AP is maintainable.

13. A system for determining a handover, the system comprising:
an Access Point (AP) that transmits one of a beacon signal and a probe response signal including handover availability information to the station, the handover availability information indicating whether a future handover from the AP is available or unavailable in the system; and
a station that:
receives the one of the beacon signal and the probe response signal including the handover availability information
stores the handover availability information received from the AP;
connects to the AP, after receiving and storing the handover availability information from the AP;
determines whether a handover condition is fulfilled in the connected state with the AP; and
prevents an attempt for a handover in the system, when the handover condition is fulfilled, and the stored handover availability information is set to "unavailable",
wherein the attempt for the handover includes searching for a new AP available for the handover, and further includes at least one of transmitting a signal for connection with the new AP found by the searching and transmitting a signal to the AP requesting to perform a handover procedure, and wherein if an Extended Service Set (ESS) only has the AP, the handover availability information is set to "unavailable".

* * * * *